(12) United States Patent
Loo

(10) Patent No.: US 6,674,636 B2
(45) Date of Patent: Jan. 6, 2004

(54) KEYBOARD DEVICE FOR PERSONAL DIGITAL ASSISTANTS

(75) Inventor: Jyh-Yi Loo, Taipei Hsien (TW)

(73) Assignee: Jyh-Tsung Lin, Taipei (TW)

( * ) Notice: Subject to any disclaimer, the term of this patent is extended or adjusted under 35 U.S.C. 154(b) by 21 days.

(21) Appl. No.: 10/054,642

(22) Filed: Jan. 22, 2002

(65) Prior Publication Data

US 2003/0137803 A1 Jul. 24, 2003

(51) Int. Cl.[7] .................................................. G06F 1/16
(52) U.S. Cl. ........................ 361/680; 361/686; 345/903
(58) Field of Search ............................... 361/680, 686; 345/903, 904

(56) References Cited

U.S. PATENT DOCUMENTS 6,457,996 B1 * 10/2002 Shih ........................... 439/638

OTHER PUBLICATIONS

Lin et al., "Keyboard Assembly With Positioning Function", 27, Feb. 2003, U.S. patent application Publication Pub. No. 2003/0039503 A1.*

* cited by examiner

Primary Examiner—Darren Schuberg
Assistant Examiner—Yean-Hsi Chang
(74) Attorney, Agent, or Firm—Grossman Tucker Perreault & Pfleger, PLLC

(57) ABSTRACT

A keyboard device for a personal digital assistant (PDA) includes first and second casing members that are pivotally interconnected, and a keyboard module mounted on inner surfaces of the casing members. The inner surface of one of the casing members further has a support frame for adjustably supporting the PDA. A connector unit on the support frame connects electrically the PDA to the keyboard module.

6 Claims, 14 Drawing Sheets

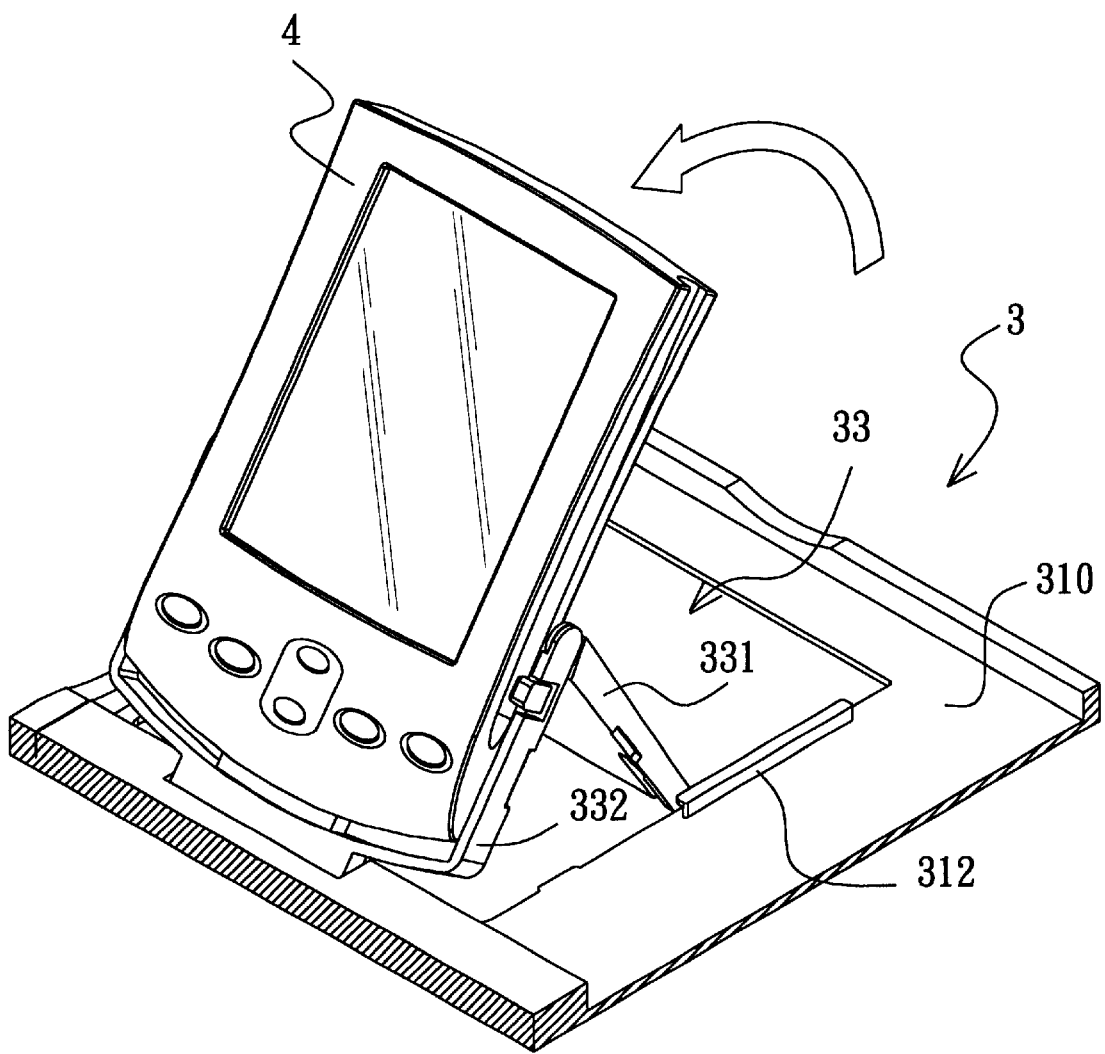
F I G. 7

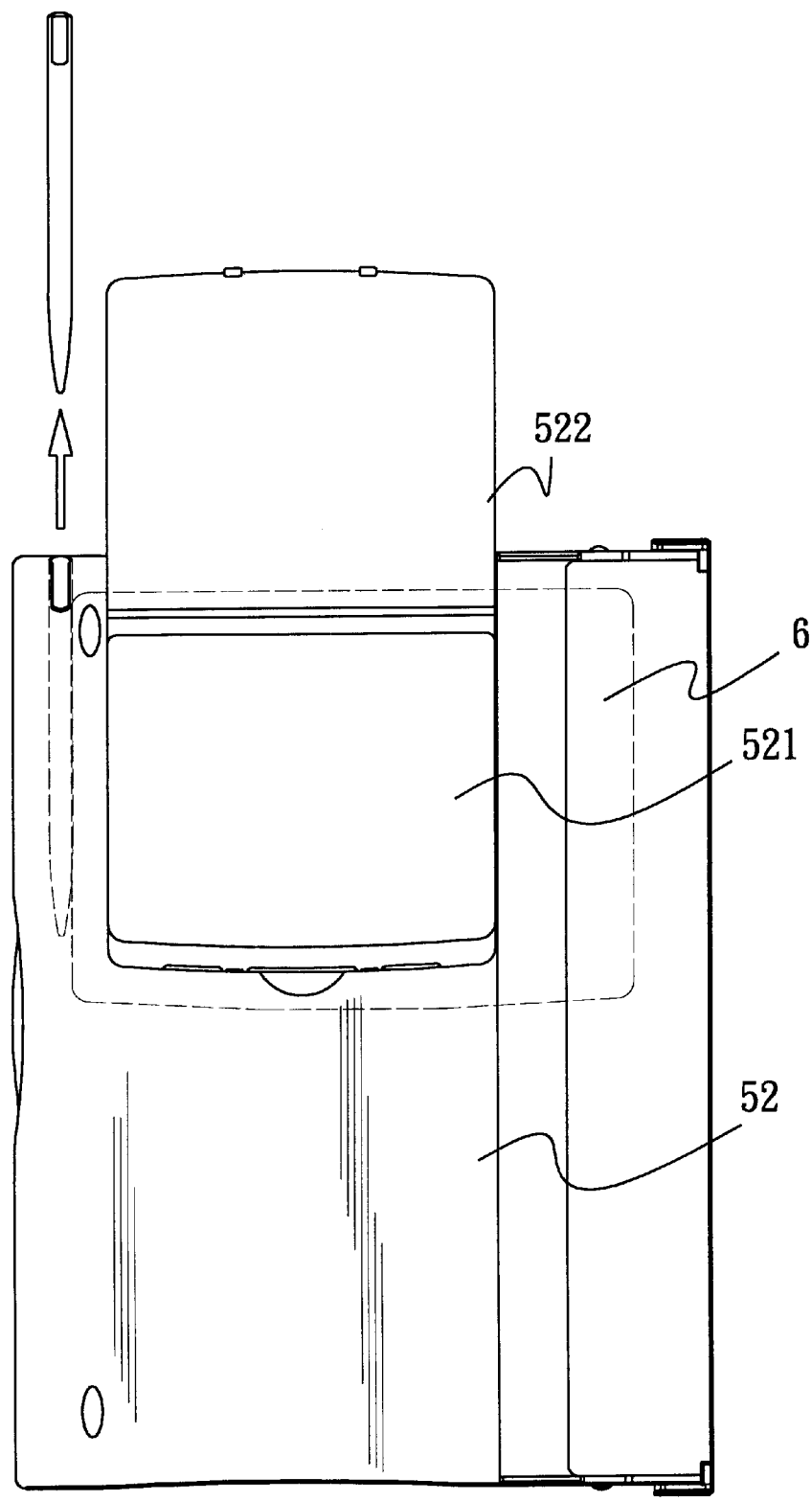
F I G. 14

KEYBOARD DEVICE FOR PERSONAL DIGITAL ASSISTANTS

BACKGROUND OF THE INVENTION

1. Field of the Invention

The invention relates to a keyboard device for personal digital assistants, more particularly to a keyboard device for personal digital assistants that is convenient to carry and use.

2. Description of the Related Art

A conventional keyboard device 1 for personal digital assistants is shown in FIG. 1 to include a keyboard module 11 and a cover module 12 coupled to a rear end of the keyboard module 11 such that the cover module 12 is pivotable from a closed position, where the inner surface of the cover module 12 overlies the keyboard module 11, to an open position, where the cover module 12 is oriented at an angle relative to the keyboard module 11. The keyboard module 11 has a top side 110 provided with a keypad unit 13. A receiving slot 14 of the keyboard device 1 connects a personal digital assistant 2 to the keypad unit 13 such that the user can input data into the personal digital assistant 2 through the keypad unit 13.

When the keyboard device 1 is used for inputting data into the personal digital assistant 2, the cover module 12 is opened first, and the personal digital assistant 2 is then positioned in the receiving slot 14. Upon finishing the data input operation, the personal digital assistant 2 should be removed before the cover module 12 can be closed to overlie the keyboard module 11. The aforesaid opening, positioning, removing and closing steps are performed each time the keyboard device 1 is used for inputting data into the personal digital assistant 2. Therefore, the conventional keyboard device 1 is not convenient to use and is also inconvenient to carry since it lacks a facility for storing the personal digital assistant 2 therein.

SUMMARY OF THE INVENTION

Therefore, the object of the present invention is to provide a keyboard device for personal digital assistants that is convenient to use and carry.

Accordingly, the keyboard device for a personal digital assistant with an I/O port of this invention includes a first casing member, a second casing member, a pivot unit, a keyboard module, a support frame and a connector unit.

The first casing member has an inner surface, a first longitudinal portion and a second longitudinal portion opposite to the first longitudinal portion in a transverse direction. The inner surface is divided in the transverse direction into a first keyboard mounting part and a frame mounting part. The second casing member has a third longitudinal portion and a fourth longitudinal portion opposite to the third longitudinal portion in the transverse direction. The second casing member further has an inner surface with a second keyboard mounting part. The pivot unit interconnects pivotally the first and third longitudinal portions, thereby permitting relative movement between the first and second casing members from an open position, where the first and second keyboard mounting parts are substantially coplanar, to a closed position, where the first and second keyboard mounting parts are disposed one on top of the other. The keyboard module includes a first keyboard unit mounted on the first keyboard mounting part, and a second keyboard unit mounted on the second keyboard mounting part. The support frame is mounted pivotally and adjustably on the inner surface of the first casing member at the frame mounting part, and is adapted to support the personal digital assistant at an inclined angle relative to the inner surface of the first casing member. The connector unit is mounted on the support frame and is connected electrically to the keyboard module. The connector unit is adapted to connect electrically with the I/O port of the personal digital assistant.

BRIEF DESCRIPTION OF THE DRAWINGS

Other features and advantages of the present invention will become apparent in the following detailed description of the preferred embodiments with reference to the accompanying drawings, of which:

FIGS. 6 to 8 illustrate how the personal digital assistant is mounted and adjusted on the preferred embodiment of FIG. 2;

FIGS. 12 to 14 illustrate another preferred embodiment of the keyboard device for personal digital assistants according to this invention.

DETAILED DESCRIPTION OF THE PREFERRED EMBODIMENT

Figure 1:
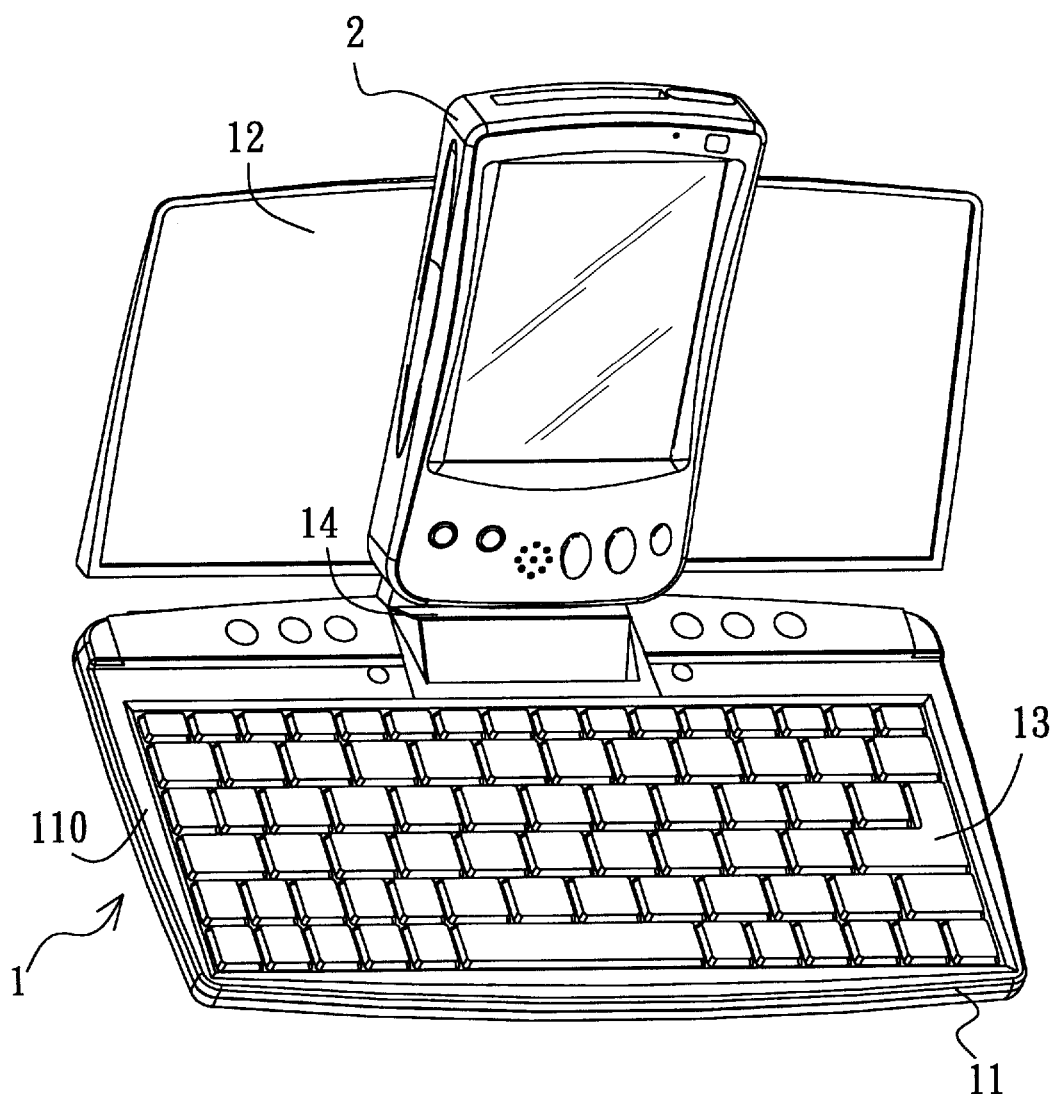
FIG. 1 is a perspective view of a conventional keyboard device for personal digital assistants.
Figure 2:
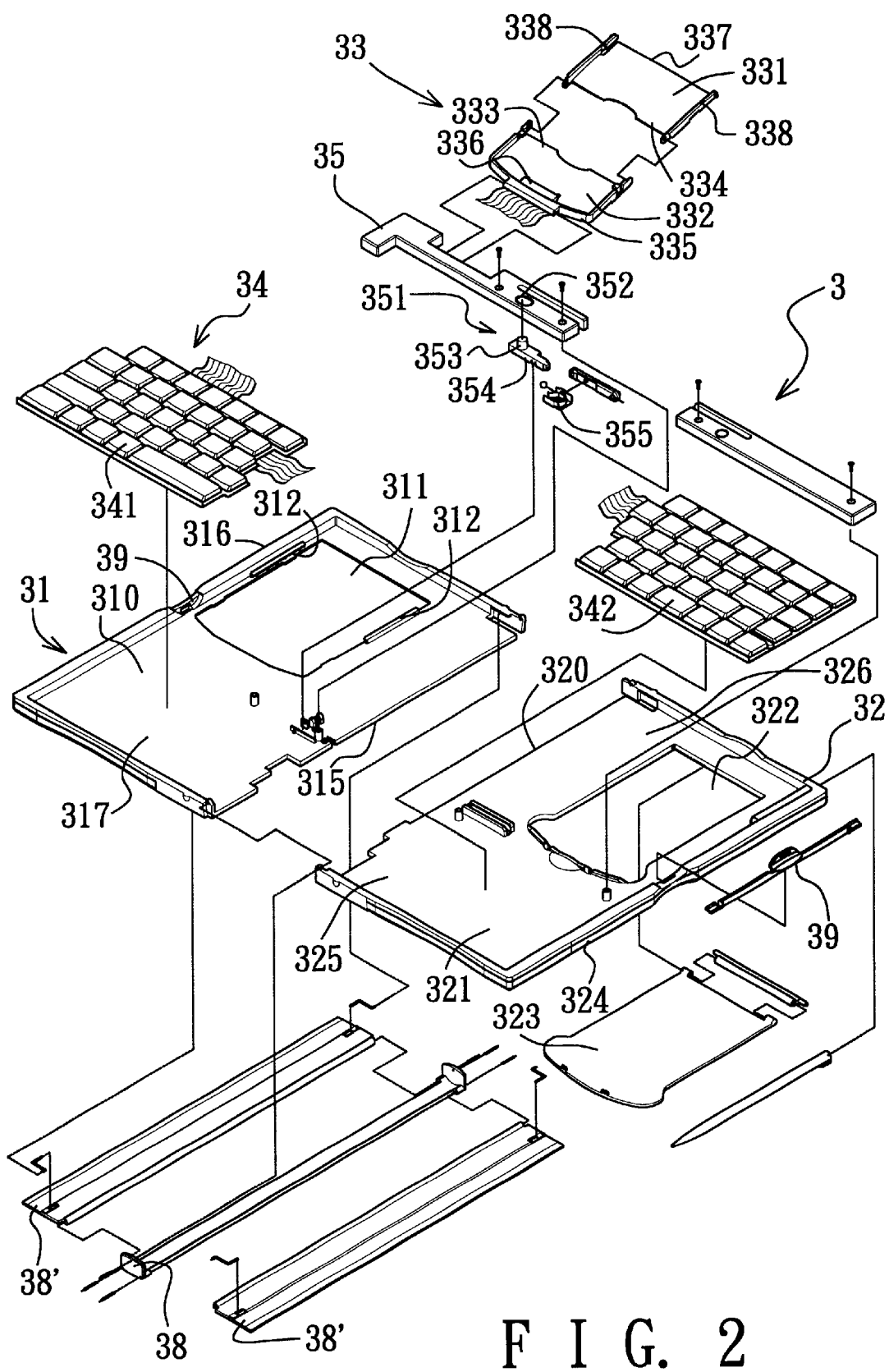
FIG. 2 is an exploded perspective view of the preferred embodiment of a keyboard device for personal digital assistants according to this invention.

Referring to FIG. 2, the preferred embodiment of a keyboard device 3 for a personal digital assistant with an I/O port according to this invention is shown to include a first casing member 31, a second casing member 32, a pivot unit 38, a keyboard module 34, a support frame 33 and a connector unit 336.

The first casing member 31 has an inner surface 310, a first longitudinal portion 316 and a second longitudinal portion 315 opposite to the first longitudinal portion 316 in a transverse direction. The inner surface 310 is divided in the transverse direction into a first keyboard mounting part 317 and a frame mounting part 311, which is formed with a parallel pair of slide rails 312 that extend longitudinally.

Figure 5:
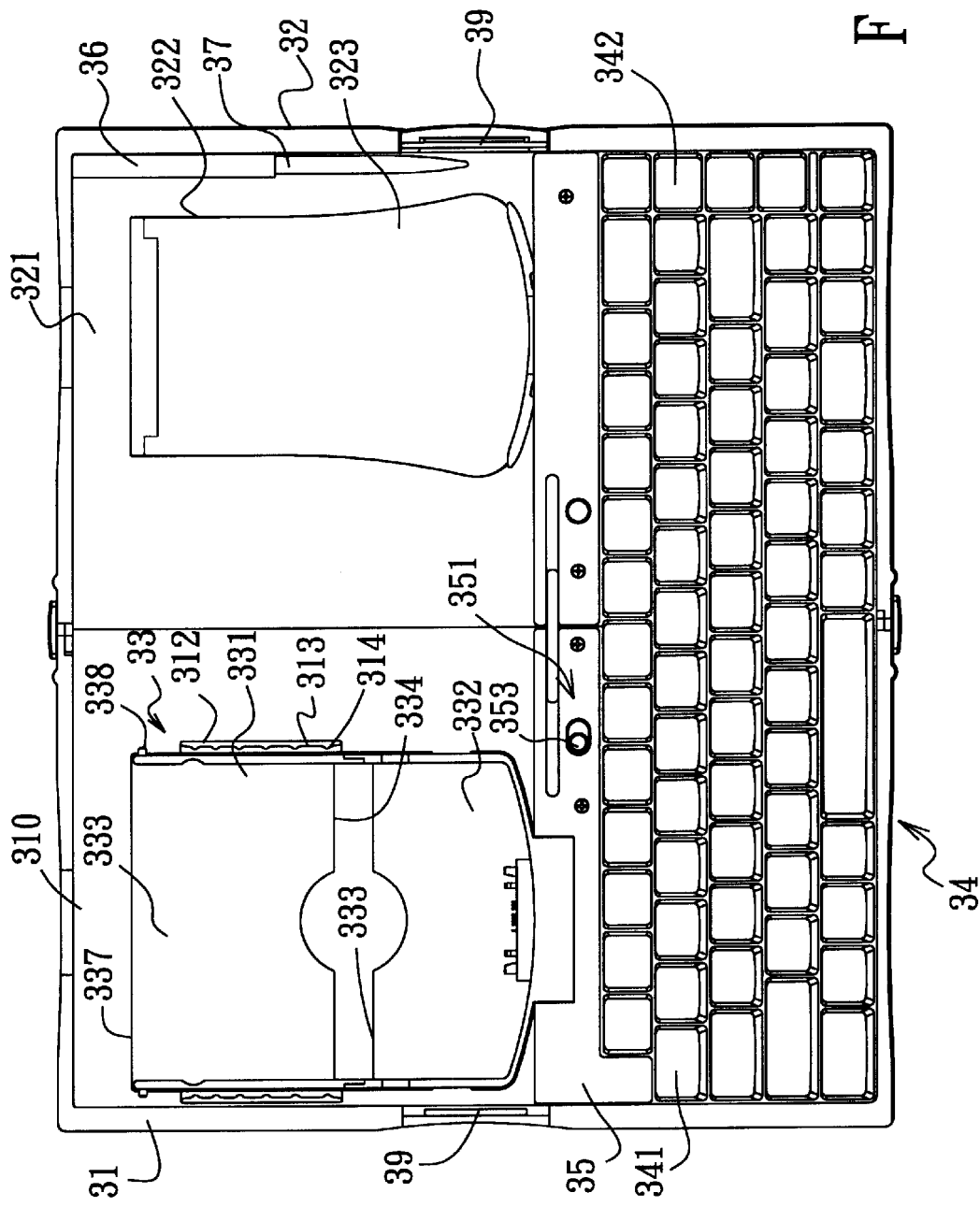
FIG. 5 is a schematic top view of the preferred embodiment of FIG. 2 in an open position.

The second casing member 32 is substantially identical in size to the first casing member 31, and has a third longitudinal portion 320 and a fourth longitudinal portion 324 opposite to the third longitudinal portion 320 in the transverse direction. The second casing member 32 further has an inner surface 321 with a second keyboard mounting part 325. Referring to FIG. 5, additionally, the second casing member 32 is formed with a recess 36 adapted to receive a touch pen 37 therein.

Figure 10:
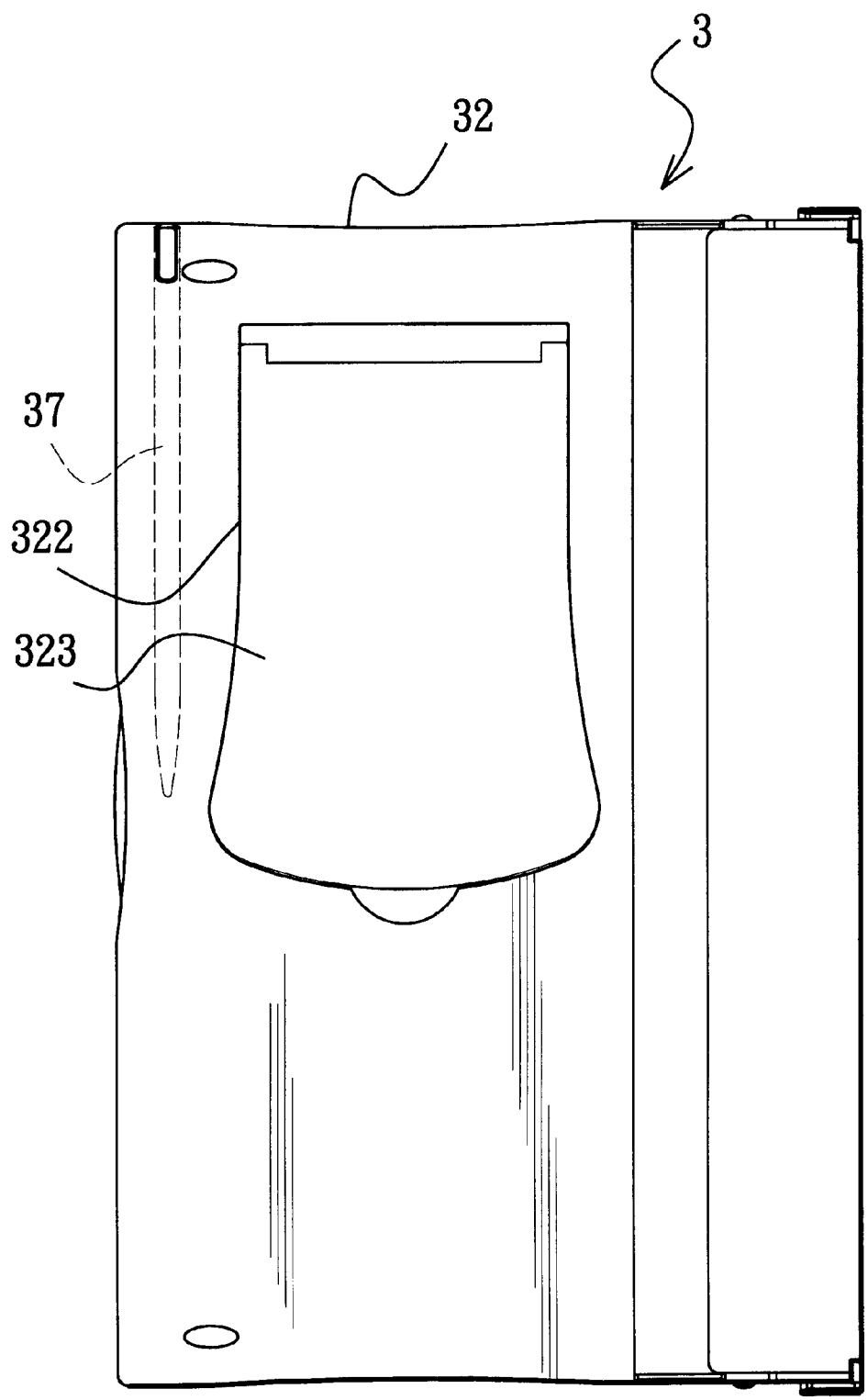
FIG. 10 is a schematic top view of the preferred embodiment of FIG. 2 in a closed position.

The pivot unit 38 interconnects pivotally the first and third longitudinal portions 315, 320, thereby permitting relative movement between the first and second casing members 31, 32 from an open position, where the first and second keyboard mounting parts 317, 325 are substantially coplanar, as shown in FIG. 5, to a closed position, where the first and second keyboard mounting parts 317, 325 are disposed one on top of the other, as shown in FIG. 10. Preferably, two side plates 38' are provided longitudinally on each side of the pivot unit 38 for protecting the first and third longitudinal portions 315, 320.

The keyboard module 34 includes a first keyboard unit 341 mounted on the first keyboard mounting part 317 of the inner surface 310 of the first casing member 31, and a second keyboard unit 342 mounted on the second keyboard mounting part 325 of the inner surface 312 of the second casing member 32. The first keyboard unit 341 and the second keyboard unit 342 are interconnected electrically via a flexible printed circuit. In view of the pivot unit 38, the keyboard module 34 can be completely received within a space confined by the first casing member 31 and the second casing member 32 when the latter are in the closed position.

The support frame 33 is mounted pivotally and adjustably on the inner surface 310 of the first casing member 31 at the frame mounting part 311 between the slide rails 312, and is adapted to support the personal digital assistant 4 (see FIG. 8) at an inclined angle relative to the inner surface 310 of the first casing member 31. The support frame 33 includes a rectangular first frame member 332 and a rectangular second frame member 331. The first frame member 332 has a pivot connection part 335 mounted pivotally on the inner surface 310 of the first casing member 31 at the frame mounting part 311 by means of a mounting member 35, and a first frame connecting part 333 opposite to the pivot connection part 335. The second frame member 331 has a second frame connecting part 334 coupled pivotally to the first frame connecting part 333, and an anchor connection part 337 opposite to the second frame connecting part 334. The first frame member 332 is pivotable relative to the first casing member 31 about a first axis. The second frame member 331 is pivotable relative to the first frame member 332 about a second axis. The first and second axes extend in the transverse direction.

Figure 3:
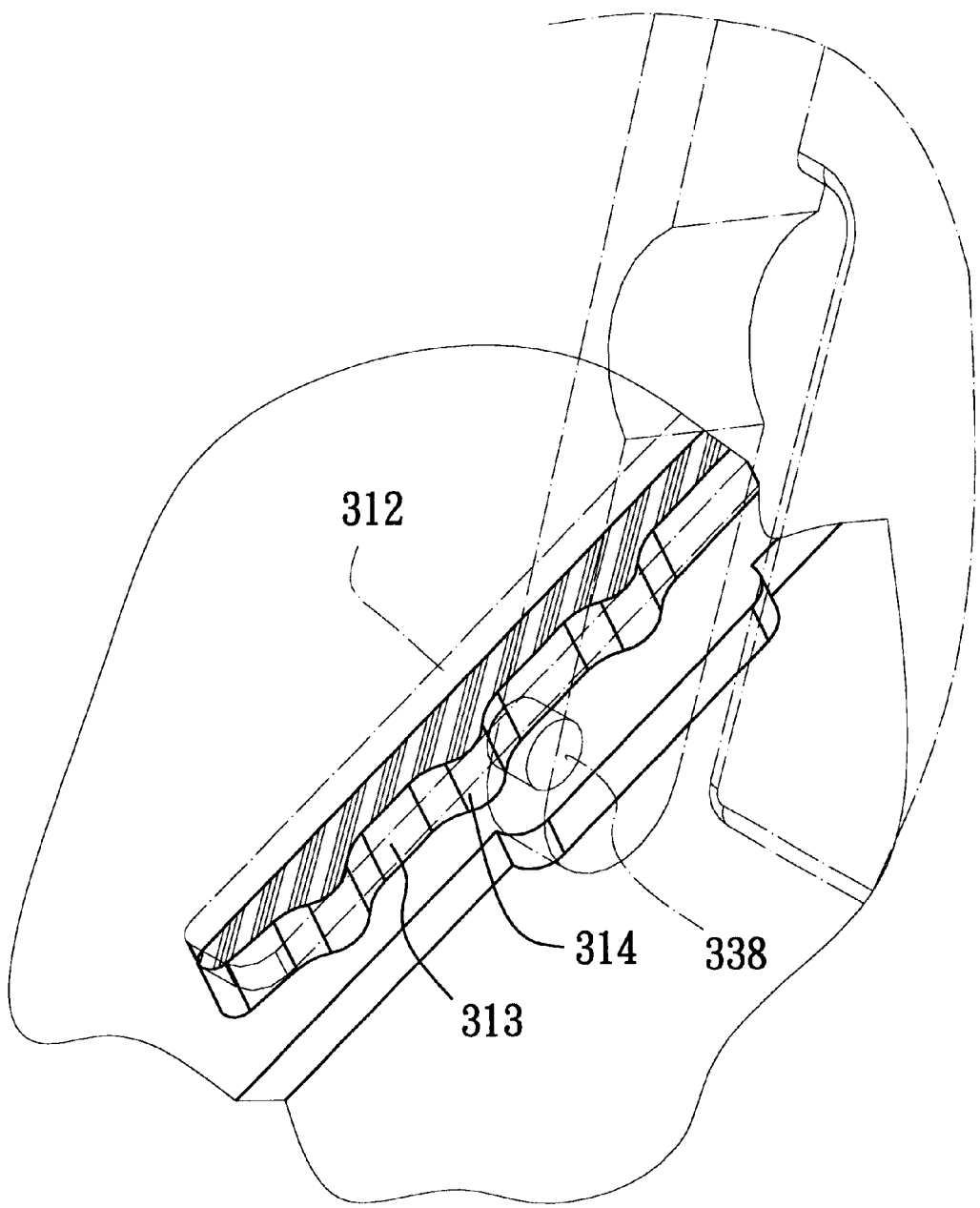
FIG. 3 is a fragmentary perspective view to show how an anchor connection part of a second frame member of a support frame engages and disengages a slide rail on a first casing member.
Figure 4:
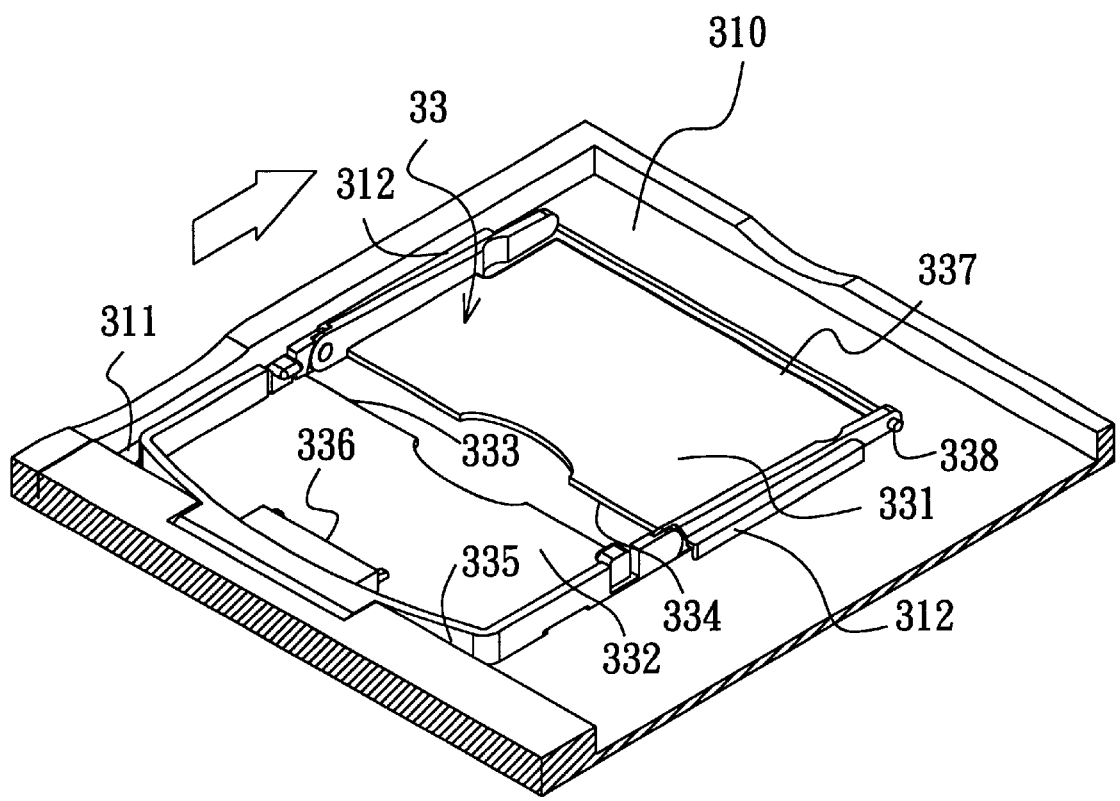
FIG. 4 is a fragmentary perspective view of the frame mounting part of the first casing member.

Referring to FIGS. 2 and 3, each slide rail 312 has one surface that confronts the support frame 33 and that is formed with alternately disposed projections 314 and grooves 313. The anchor connection part 317 of the second frame member 331 is formed with a pair of anchor projections 338 for engaging and disengaging the grooves 313 in the confronting surfaces of the slide rails 312 selectively, thereby varying inclination of the first frame member 332 relative to the first casing member 31. Referring to FIG. 4, the anchor projections 338 can be disengaged from the slide rails 312 such that the first and second frame members 332, 331 are substantially coplanar.

Referring again to FIG. 2, the connector unit 336 is mounted on the pivot connection part 335 of the first frame member 332 of the support frame 33 and is connected electrically to the keyboard module 34 via a flexible printed circuit. The connector unit 336 is adapted to connect electrically with the I/O port of the personal digital assistant 4.

Furthermore, the inner surface 321 of the second casing part 32 further has a cover mounting part 326 disposed to overlap the frame mounting part 33 when the first and second casing members 31, 32 are moved to the closed position. The cover mounting part 326 is formed with a window opening 322 corresponding to the support frame 33 and adapted to permit access to the personal digital assistant 4 (see FIG. 11) on the support frame 33 when the personal digital assistant 4 is confined between the casing members 31, 32 while the latter are at the closed position. The keyboard device 3 further includes a transparent cover panel 323 mounted pivotally on the cover mounting part 326 for closing the window opening 322 selectively.

Figure 6:
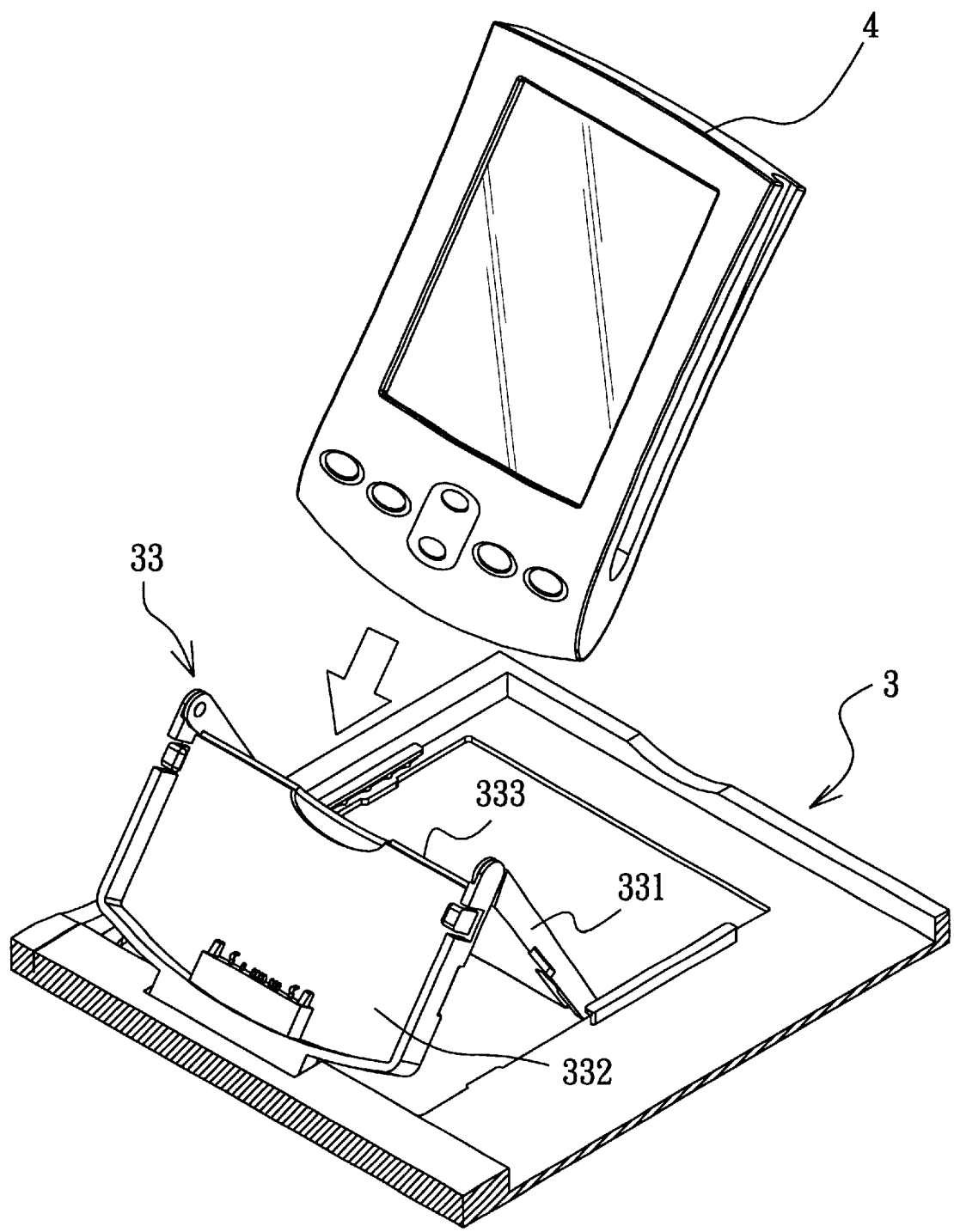

Referring to FIGS. 5 and 6, when it is desired to input data into the personal digital assistant 4 via the keyboard device 3, the first and second casing members 31, 32 are moved to the open position, and the second frame member 331 is pivoted relative to the first frame member 332 such that the anchor projections 338 of the anchor connection part 317 of the second frame member 331 move along the slide rails 312, and the first frame member 332 pivots relative to the first casing member 31. After adjusting the first frame member 332 to a desired inclined angle relative to the inner surface 310 of the first casing member 31, the anchor projections 338 can engage the corresponding grooves 313 in the confronting surfaces of the slide rails 312 for retaining the first frame member 332 at the desired inclined angle. Referring to FIG. 7, the personal digital assistant 4 is then mounted on the first frame member 332 of the support frame 33 such that the I/O port (not shown) of the personal digital assistant 4 connects electrically with the connector unit 336 on the pivot connection part 335 of the first frame member 332 of the support frame 33. Therefore, the keyboard device 3 can be used to input data into the personal digital assistant 4 via the keyboard module 34 when the personal digital assistant 4 is mounted on the support frame 33 of the keyboard device 3.

Figure 8:
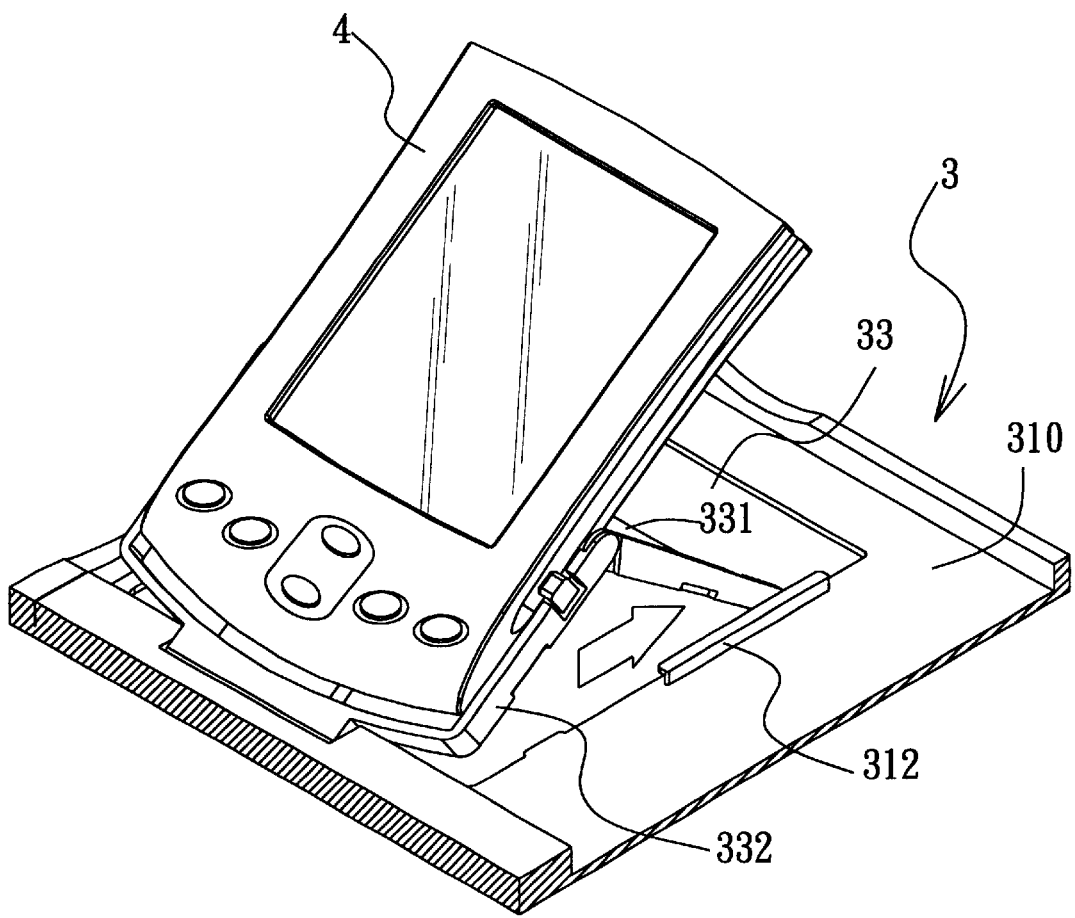
Figure 9:
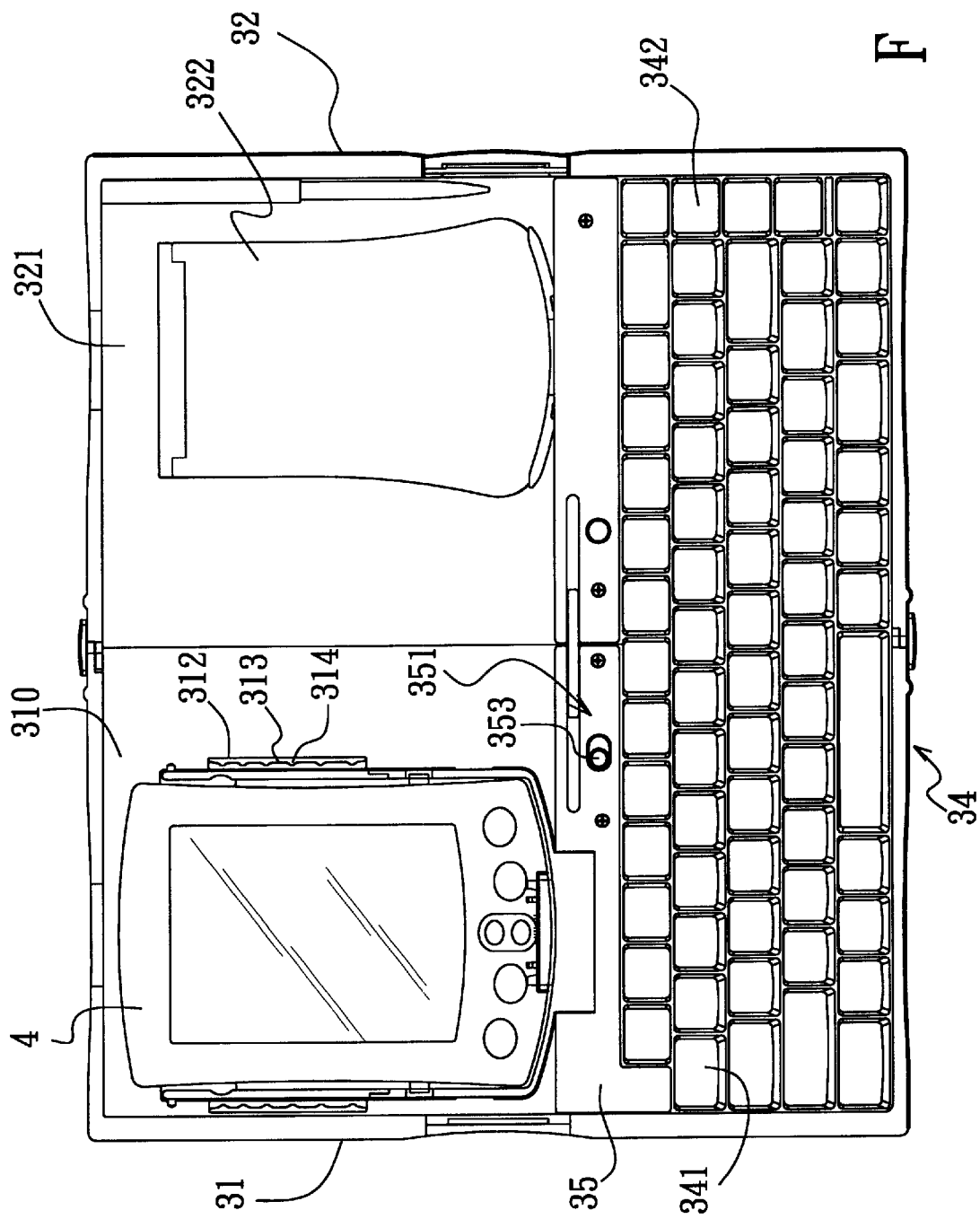
FIG. 9 is a view similar to FIG. 5 but with the personal digital assistant mounted thereon.
Figure 11:
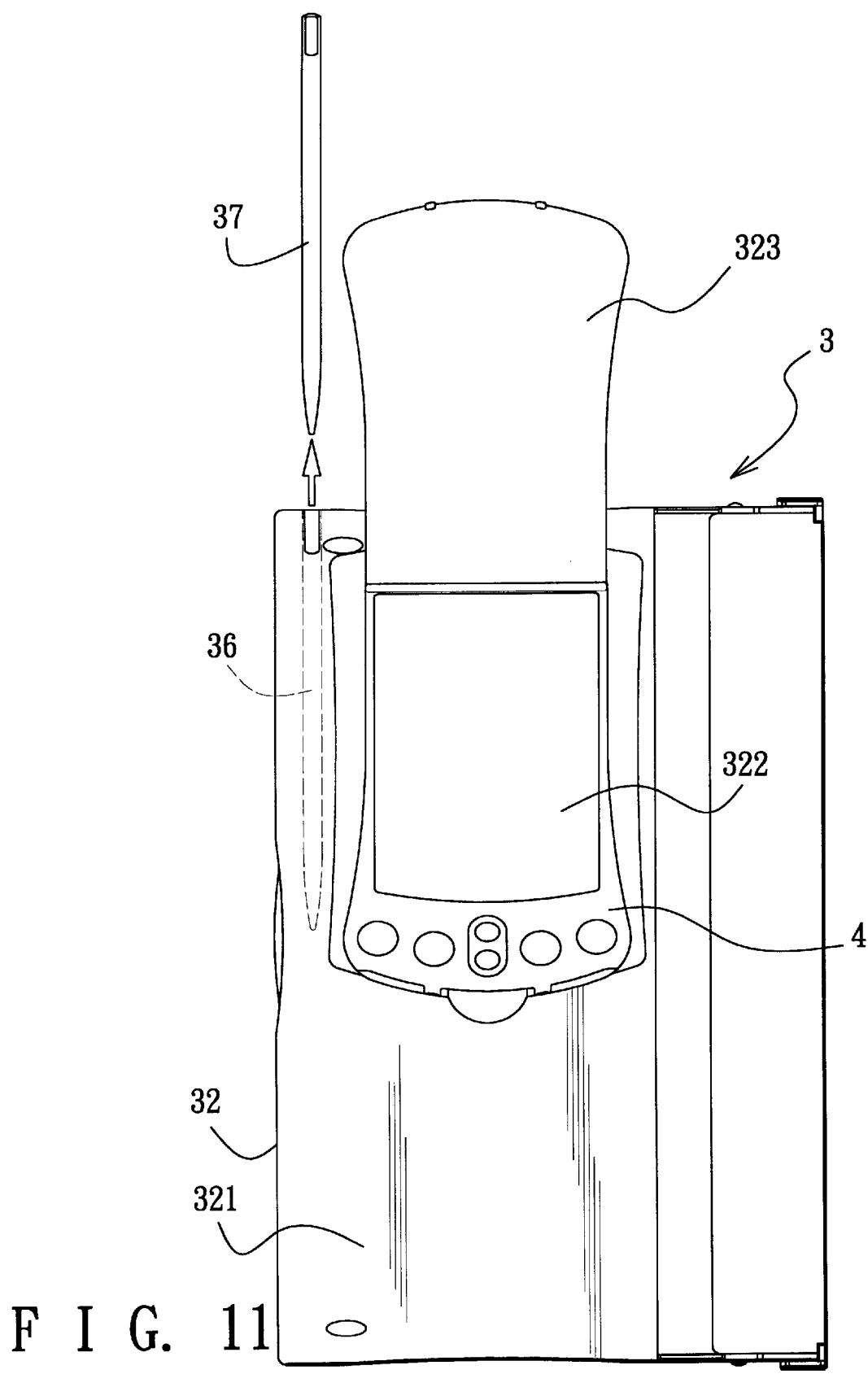
FIG. 11 is a view similar to FIG. 10 but with a cover panel in an opened state.

Upon finishing the data input operation, referring to FIG. 8, the second frame member 331 is moved in a direction away from the first frame member 332 so that the first and second frame members 332, 331 are disposed substantially coplanar, as shown in FIG. 9. The first and second casing members 31, 32 are then moved to the closed position shown in FIG. 10. It is not necessary to remove the personal digital assistant 4 from the keyboard device 3 of this invention when the first and second casing members 31, 32 are closed after finishing the data input operation. Referring to FIGS. 10 and 11, furthermore, the personal digital assistant 4 mounted within the keyboard device 3 can be accessed by the touch pen 37 via the window opening 322 after opening the cover panel 323, thereby resulting in added convenience during use.

Referring to FIGS. 2 and 5, a stop unit 351 is provided on a mounting member 35 so as to arrest undesired movement of the first and second casing members 31, 32 from the open position to the closed position. The stop unit 351 includes an actuating arm 354 and a spring-loaded locking member 355. The actuating arm has a protruding port 353 extending upwardly into an opening 352 in the mounting member 35. The protruding port 353 can be operated to move in the opening 352 along the transverse direction, thereby enabling the actuating arm 354 to move the locking member 355 between locking and unlocking states.

Furthermore, a locking unit 39 is provided on the second and fourth longitudinal portions 315, 324 of the first and second casing members 31, 32 for locking releasably the first and second casing members 31, 32 at the closed position. Since embodiments of the locking unit 39 are well known to those skilled in the art, and since the pertinent features of the present invention do not reside in the particular construction thereof, a description of the locking unit 39 will be dispensed with herein for the sake of brevity.

Figure 12:
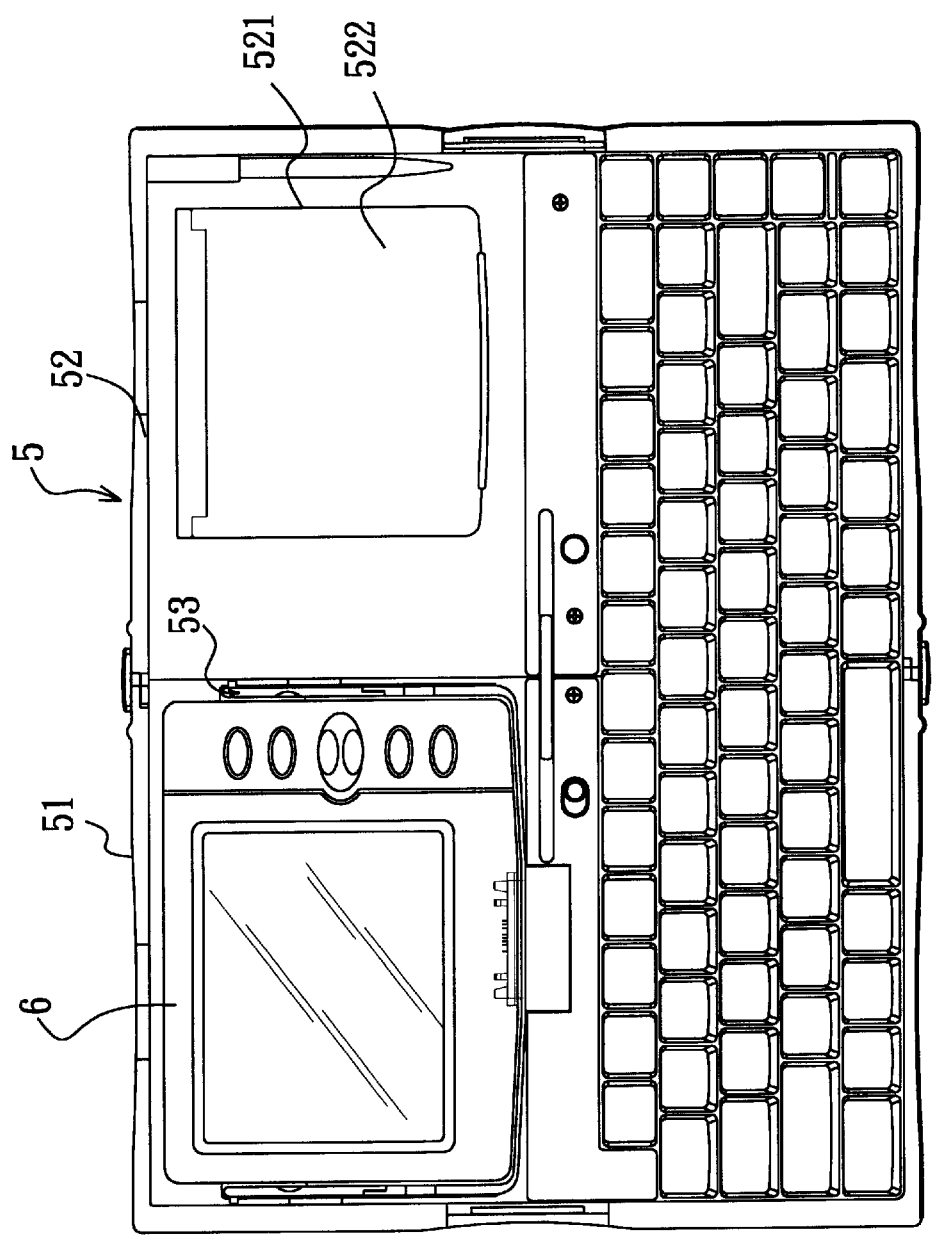
Figure 13:
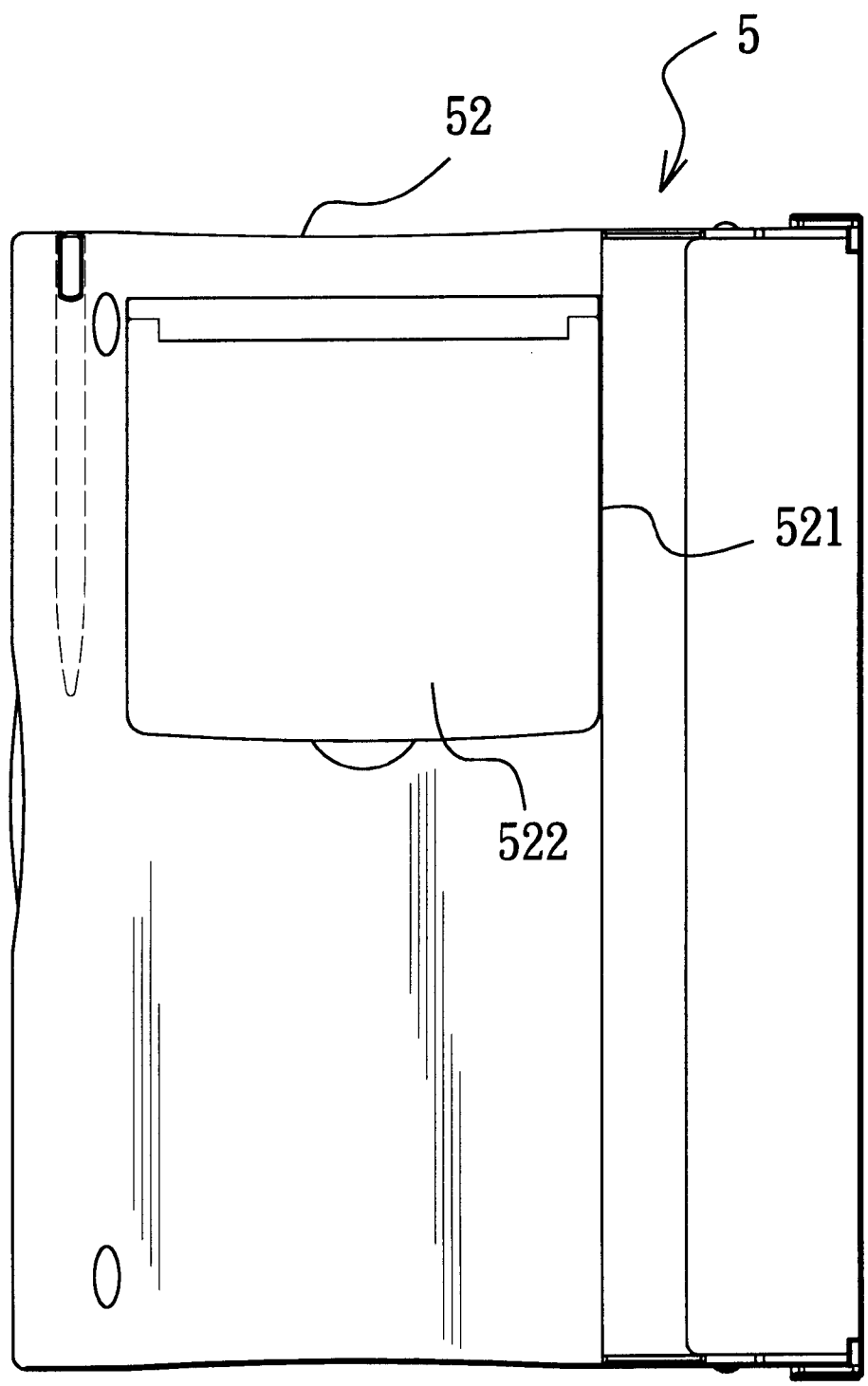

FIGS. 12 to 14 illustrate another preferred embodiment of the keyboard device 5 for personal digital assistants according to this invention. The keyboard device 5 of this embodiment differs from the keyboard device 3 of the previous embodiment primarily in that the support frame 53 mounted on the first casing member 51 is constructed for mounting another type of the personal digital assistant 6. The sizes of the window opening 521 and the transparent cover panel 522 are also changed to correspond with the configuration of support frame 53.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

I claim:

1. A keyboard device for a personal digital assistant with an I/O port, said keyboard device comprising:

a first casing member having an inner surface, a first longitudinal portion and a second longitudinal portion opposite to said first longitudinal portion in a transverse direction, said inner surface being divided in the transverse direction into a first keyboard mounting part and a frame mounting part;

a second casing member having a third longitudinal portion and a fourth longitudinal portion opposite to said third longitudinal portion in the transverse direction, said second casing member further having an inner surface with a second keyboard mounting part;

a pivot unit for interconnecting pivotally said first and third longitudinal portions, thereby permitting relative movement between said first and second casing members from an open position, where said first and second keyboard mounting parts are substantially coplanar, to a closed position, where said first and second keyboard mounting parts are disposed one on top of the other;

a keyboard module including a first keyboard unit mounted on said first keyboard mounting part, and a second keyboard unit mounted on said second keyboard mounting part;

a support frame mounted pivotally and adjustably on said inner surface of said first casing member at said frame mounting part and adapted to support the personal digital assistant at an inclined angle relative to said inner surface of said first casing member;

a connector unit mounted on said support frame and connected electrically to said keyboard module, said connector unit being adapted to connect electrically with the I/O port of the personal digital assistant;

a first frame member having a pivot connection part mounted pivotally on said inner surface of said first casing member at said frame mounting part, and a first frame connecting part opposite to said pivot connection part;

a second frame member having a second frame connecting part coupled pivotally to said first frame connecting part, and an anchor connection part opposite to said second frame connecting part;

a first frame member is pivotable relative to said first casing part about a first axis, said second frame member being pivotable relative to said first frame member about a second axis, said first and second axes extending in the transverse direction;

said frame mounting part of said inner surface of said first casing member is formed with a slide rail on one side of said support frame, said slide rail having one surface that confronts said support frame and that is formed with alternatively disposed projections and grooves, said anchor connection part of said second frame member being formed with an anchor projection for engaging and disengaging said grooves in said surface of said slide rail selectively, thereby varying inclination of said first frame member relative to said first casing member.

2. The keyboard device as claimed in claim 1, wherein said connector unit is mounted on said pivot connection part of said first frame member.

3. The keyboard device as claimed in claim 1, further comprising a locking unit provided on said first and second casing members for locking releasably said first and second casing members at the closed position.

4. A keyboard device for a personal digital assistant with an I/O port, said keyboard device comprising:

a first casing member having an inner surface, a first longitudinal portion and a second longitudinal portion opposite to said first longitudinal portion in a transverse direction, said inner surface being divided in the transverse direction into a first keyboard mounting part and a frame mounting part;

a second casing member having a third longitudinal portion and a fourth longitudinal portion opposite to said third longitudinal portion in the transverse direction, said second casing member further having an inner surface with a second keyboard mounting part;

a pivot unit for interconnecting pivotally said first and third longitudinal portions, thereby permitting relative movement between said first and second casing members from an open position, where said first and second keyboard mounting parts are substantially coplanar, to a closed position, where said first and second keyboard mounting parts are disposed one on top of the other;

a keyboard module including a first keyboard unit mounted on said first keyboard mounting part, and a second keyboard unit mounted on said second keyboard mounting part;

a support frame mounted pivotally and adjustably on said inner surface of said first casing member at said frame mounting part and adapted to support the personal digital assistant at an inclined angle relative to said inner surface of said first casing member;

a connector unit mounted on said support frame and connected electrically to said keyboard module, said connector unit being adapted to connect electrically with the I/O port of the personal digital assistant;

wherein said inner surface of said second casing part further has a cover mounting part disposed to overlap said frame mounting part when said first and second casing parts are move to the closed position, said cover mounting part being formed with a window opening corresponding to said support frame and adapted to permit access to the personal digital assistant on said support frame, said keyboard device further comprising a transparent cover panel mounted on said cover mounting part for closing said window opening selectively.

5. A keyboard device for a personal digital assistant with an I/O port, said keyboard device comprising:

a first casing member having an inner surface, a first longitudinal portion and a second longitudinal portion opposite to said first longitudinal portion in a transverse direction, said inner surface being divided in the transverse direction into a first keyboard mounting part and a frame mounting part;

a second casing member having a third longitudinal portion and a fourth longitudinal portion opposite to said third longitudinal portion in the transverse direction, said second casing member further having an inner surface with a second keyboard mounting part;

a pivot unit for interconnecting pivotally said first and third longitudinal portions, thereby permitting relative movement between said first and second casing members from an open position, where said first and second keyboard mounting parts are substantially coplanar, to a closed position, where said first and second keyboard mounting parts are disposed one on top of the other;

a keyboard module including a first keyboard unit mounted on said first keyboard mounting part, and a second keyboard unit mounted on said second keyboard mounting part;

a support frame mounted pivotally and adjustably on said inner surface of said first casing member at said frame mounting part and adapted to support the personal digital assistant at an inclined angle relative to said inner surface of said first casing member;

a connector unit mounted on said support frame and connected electrically to said keyboard module, said connector unit being adapted to connect electrically with the I/O port of the personal digital assistant;

wherein at least one of said first and second casing members is formed with a recess adapted to receive a touch pen therein.

6. A keyboard device for a personal digital assistant with an I/O port, said keyboard device comprising:

a first casing member having an inner surface, a first longitudinal portion and a second longitudinal portion opposite to said first longitudinal portion in a transverse direction, said inner surface being divided in the transverse direction into a first keyboard mounting part and a frame mounting part;

a second casing member having a third longitudinal portion and a fourth longitudinal portion opposite to said third longitudinal portion in the transverse direction, said second casing member further having an inner surface with a second keyboard mounting part;

a pivot unit for interconnecting pivotally said first and third longitudinal portions, thereby permitting relative movement between said first and second casing members from an open position, where said first and second keyboard mounting parts are substantially coplanar, to a closed position, where said first and second keyboard mounting parts are disposed one on top of the other;

a keyboard module including a first keyboard unit mounted on said first keyboard mounting part, and a second keyboard unit mounted on said second keyboard mounting part;

a support frame mounted pivotally and adjustably on said inner surface of said first casing member at said frame mounting part and adapted to support the personal digital assistant at an inclined angle relative to said inner surface of said first casing member;

a connector unit mounted on said support frame and connected electrically to said keyboard module, said connector unit being adapted to connect electrically with the I/O port of the personal digital assistant;

further comprising a stop unit for arresting undesired movement of said first and second casing members from the open position to the closed position.

* * * * *